April 30, 1929.  A. MOORE  1,711,176
ARCHED GASKET CLOSURE
Filed May 19, 1923  2 Sheets-Sheet 1
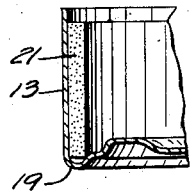
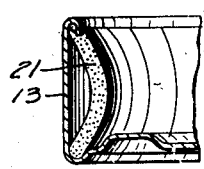
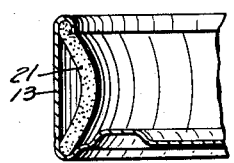
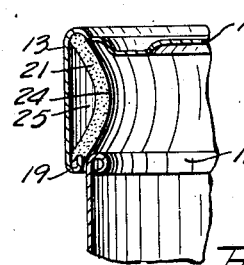
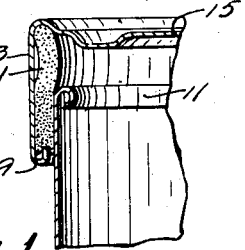
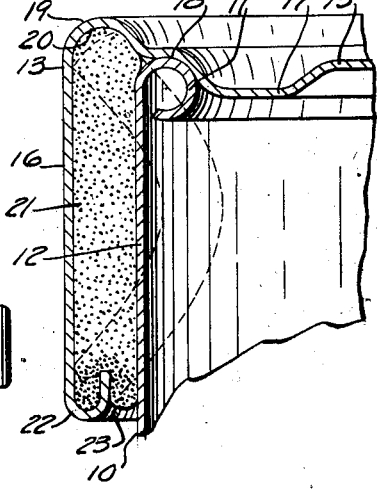
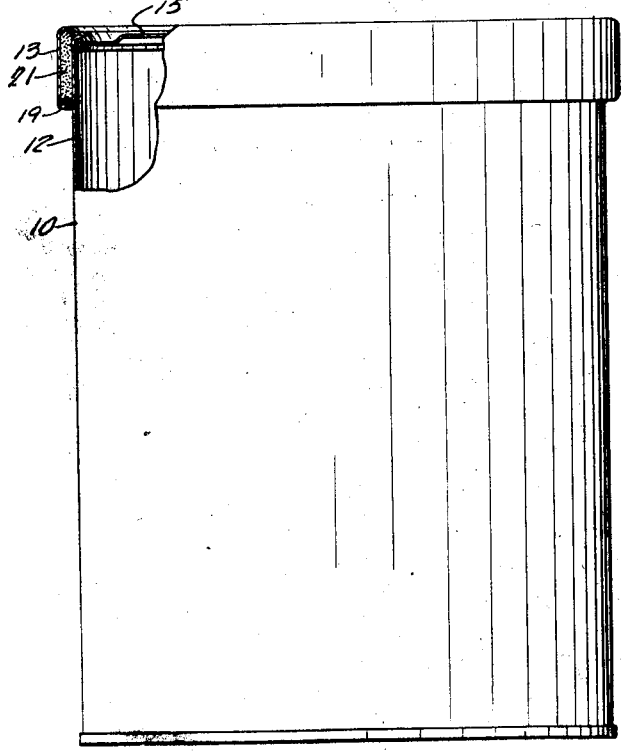
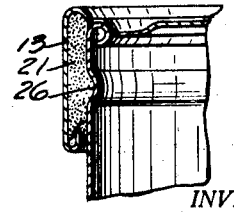
INVENTOR
Arlington Moore
BY
H. H. Dyke
ATTORNEY April 30, 1929.  A. MOORE  1,711,176
ARCHED GASKET CLOSURE
Filed May 19, 1923  2 Sheets-Sheet 2
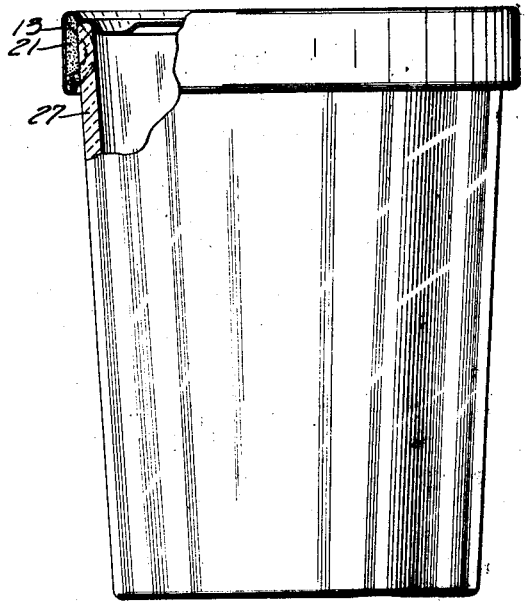
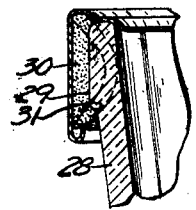
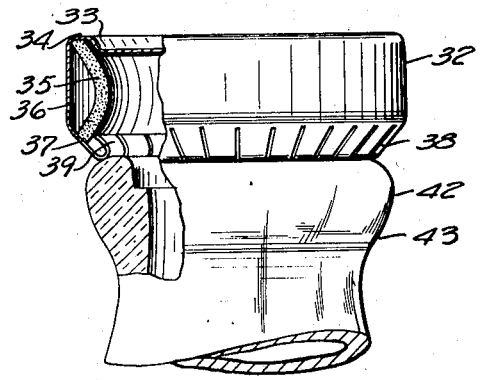
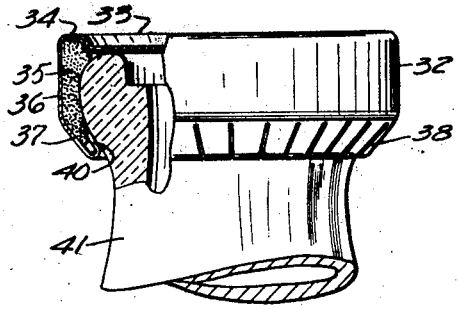
INVENTOR
Arlington Moore
BY
H. H. Dyke
ATTORNEY Patented Apr. 30, 1929.

1,711,176

UNITED STATES PATENT OFFICE.

ARLINGTON MOORE, OF WORCESTER, MASSACHUSETTS, ASSIGNOR TO MOORE INVENTIONS CORPORATION, OF WORCESTER, MASSACHUSETTS, A CORPORATION OF MASSACHUSETTS.

ARCHED GASKET CLOSURE.

Application filed May 19, 1923. Serial No. 640,106.

My invention relates to closures for containers, such as cans, canisters, tumblers, bottles and the like, and is shown herein as applied more particularly to a closure having a flanged portion for embracing the mouth end of the container in which flange an elastic gasket is retained and serves to provide a hermetic seal when the closure is put on the container.

Where closures are made use of wherein elastic gaskets of rubber or the like material are confined within fixed limits, and compression, that is to say, reduction in volume due to pressure, is alone relied on to secure a tight seal, I have found that if practicable at all they are not suited for application and removal by hand, as very considerable power is required for putting on and taking off the cover. Furthermore, the extent of gasket compression or reduction in volume is relatively inconsiderable, so that any slight irregularities are likely to produce leaks. Gaskets of rubber or the like elastic material are, however, readily susceptible to quite extensive deformation by application of localized pressure, which need not be very great so long as provision is made for permitting what may be described as flow or displacement of the gasket material from one region to another under the localized pressure, without substantial reduction in total volume. With the closure of the present invention this characteristic of such elastic gaskets is made use of in an advantageous way.

According to the present invention the gasket is arranged to initially extend away from the other closure parts to a considerable extent leaving a space behind it into which its material may be displaced by pressure. In a preferred embodiment, this result is secured by making the width of the gasket (which is preferably an ordinary ring gasket of substantially rectangular cross-section formed by cutting off the successive part of a tube) greater than the width of the seat or recess provided therefor in the closure, with the result that the gasket at or about the middle of its cross-section is bulged or arched inwardly, leaving an open space behind it and between it and the flange wall, into which the gasket material may be displaced when the closure is applied.

In this way the gasket material originally located at the innermost part of the arch or bulge is displaced through a relatively great distance when the closure is applied to the container, giving high capacity of self-adjustment to secure a tight seal and automatically taking care of relatively great irregularities in size and form of the container or the walls thereof.

In the accompanying drawings I have shown certain embodiments of the invention for illustration of ways in which it may be carried out, but not for limitation of the invention. In said drawings, Fig. 1 is a side view with parts broken away of a metal can having a closure in place thereon. Fig. 2 is an enlargement of the sectional portion of Fig. 1 with the original arched form of the gasket shown in dotted lines. Fig. 3 is a cross-sectional view showing the closure located in position to be placed on the can, but not yet pushed thereon. Fig. 4 is a view similar to Fig. 3 with the closure pushed part way on the can. Fig. 5 is a cross-sectional view of a closure member having a gasket in place therein prior to the inturning of the edge of the flange. Fig. 6 shows the parts shown in Fig. 5, but with the margin of the flange inturned, and the gasket arched by inturning of the flange margin. Fig. 7 is a view similar to Fig. 6, but showing a slight modification in that the inturned edge of the gasket flange extends entirely over and embraces the margin of the gasket material. Fig. 8 is a sectional detail view similar to Fig. 2 and the sectional part of Fig. 1, but showing the can wall provided with a locking recess or groove to be entered by a portion of the gasket. Fig. 9 is a view similar to Fig. 1, except that in this view the container to which the closure is applied, instead of being a metal can is an ordinary glass tumbler with inwardly tapering side walls. Fig. 10 is a fragmentary sectional view, similar to the sectional portion of Fig. 9, but showing the application of the arched gasket closure to a tumbler having an undercut ledge on its outer wall near its upper end. Fig. 11 is a fragmentary side view with a portion in section showing a modified form of closure applied to a bottle, a milk bottle being shown for illustration. Fig. 12 is a view similar to Fig. 11 and showing the closure of Fig. 11 in position to be applied to the milk bottle.

Reference numeral 10 designates a container of the ordinary tin can variety, having an inturned curl 11 about the open upper end thereof and having a straight, smooth side wall 12 of substantially cylindrical form. The lid 13 comprises the cover portion 15 and the flanged portion 16, which is made of sufficient size to embrace or surround the container in the neighborhood of the mouth portion thereof, with a gasket interposed. In the form shown, the cover portion 15 is provided with an annular depression or recess 17 which merges into the head portion 18, which is preferably adapted to fit closely over the inturned marginal curl 11 of the can body. At the corner of the closure when the cover portion joins the flanged part thereof, an outwardly projecting corner bead 19 is provided, leaving an interior corner recess or seat 20 for reception of the upper margin of the gasket 21, which is of elastic material, preferably rubber or the like.

The lower margin of the flange 16 is so constructed as to retain the gasket 21 in place in a normally arched position as is shown in Fig. 3, for example, and in dotted lines in Fig. 2. In the form shown, the lower margin 22 of flange 16 is inturned as shown at 23, and the inturned edge 23 coming into contact with the gasket results in bulging or arching the gasket inwardly, as shown in Figs. 6 and 7, the difference between the showings in these cases being that in the instance of Fig. 7 the inturned edge 23' extends entirely over the lower margin of the gasket material 21, instead of partially thereover as at 23 in Fig. 6.

While it is preferable that the gasket be inserted before the gasket receiving recess in the closure flange is completed by the inturning of the lower margin thereof as just described, it is, of course, possible to reverse these operations and put the gasket in last, the particular mode of formation being unimportant so long as the width of the gasket is in excess of the width of the seat provided therefor in the closure flange. In either case the gasket forms a permanent assembly with the lid, being put on and taken off the container as a complete assembly.

The displacement effect secured when the closure is put in place will be apparent from the showing of Figs. 2, 3 and 4. The gasket 21 in its original normally arched position extends inwardly to a relatively considerable extent at what may be termed the peak or crown 24 of the arch (see Fig. 3) leaving a considerable open space 25 between the gasket and the flange wall into which the gasket material is displaced when the lid is put on the container. At the same time the gasket section is shortened because of the fact that it ultimately occupies the position corresponding to substantially the base or chord of an arc or curve, instead of extending around the curved part of the arc, as in the showing of Fig. 3. As the tendency of the rubber gasket is, of course, to return to its original arched position, the sealing effect is accommodated to a variety of depressions or deformations in the container wall, as will be apparent. The dotted section of the figures is resorted to in order to indicate to some extent the distribution of pressure and the combined deformation and compression effect which is secured by means of the arched elastic gasket having an original width in excess of the width of its seat in the closure flange.

Where the flange is made fairly wide, as in the showing of Fig. 1, a sufficient frictional hold to retain the closure in place can readily be secured by reason of the comparatively wide surface frictionally in contact with the displaced gasket material within the closure flange. If, however, an additional locking effect is desired, same can readily be secured as by providing a locking recess or recesses on the exterior of the can body within the region contacted by the gasket, and in Fig. 8 I have shown an inwardly extending recess 26 for this purpose, into which a portion of the gasket will be displaced, with consequently somewhat reduced pressure in this region, as is indicated by the extra spacing of this part of the dotted line section of Fig. 8.

The closures in accordance with the invention are applicable to containers of various kinds, as well as to the metal cans so far referred to. In Fig. 9 I have shown the closure applied to an ordinary tumbler. The closure is particularly adapted to containers of glassware, such as tumblers and the like because of the very great capacity of the closure gasket to adapt itself to irregularities and deformations of outline which are encountered with great frequency with glassware, such as tumblers and the like.

The walls of tumbler 27 taper inwardly and in this way a locking effect is secured, the deformed gasket making a sort of dovetail locking key, as will be plain from the showing in Fig. 9. Other containers, such as can bodies, may be similarly formed if desired and give the same result when the arched gasket closure is applied. In Fig. 10 I have shown a glass tumbler with a cylindrical margin 28 terminating in a projecting ledge 29 below which the deformed gasket 30 may expand, as indicated at 31, forming a lock which prevents removal of the closure until a substantially pulling force is applied. To remove a closure from such a container the pressure or pull should be concentrated at one side to produce a tilting action in starting the removal of the closure consisting of the lid and gasket, both of which come off together as a single assembly.

While the closure may be applied in vacuo, if desired, and so provide what is usually referred to as a vacuum seal, the sealing effect of the present closure is in no way dependent upon a vacuum, but the closure affords a completely tight, hermetic seal without the aid of vacuum.

In Figs. 11 and 12 I have shown a further modification wherein the closure is especially adapted for bottles and particularly for milk bottles. Filled milk bottles are fairly heavy and are customarily handled by the tops, and it is desirable with containers of this sort to provide an additional holding or gripping means, and at the same time to make use of the arched gasket with its advantageous features already referred to.

In the closure 32 of Figs. 11 and 12 the cover portion 33 has a corner recess 34 formed therein to receive the upper edge of the gasket 35, as in the case of the closures already referred to, but the flange 36 is formed somewhat differently at its lower edge, being turned inwardly at an angle, shown at 37, and having the edge thereof provided with a series of slots 38, 38, which separate the inturned portion 37 into a plurality of spring tongues 39. These tongues 39 are turned over at the margin thereof, as indicated at 40, and the seat for the lower edge of the gasket 35 is formed by the inturned part 38 and the turned over tongue portions 40. Preferably the gasket is put in place before the inturning operations are carried out, as in the case of the operations described in connection with Figs. 5, 6 and 7, though this is not essential. When the closure 32 is put on the bottle 41 by being pushed downwardly over the end thereof from the position indicated in Fig. 12 to that of Fig. 11, the spring tongues 39 yield and are expanded outwardly by rounded neck 42 of the bottle 41, and as they pass downward thereover contract and grip against the lower end of the rounded neck portion 42, as indicated at 43, Fig. 11. The arched gasket 35, which, as already described, has a large range of deformation movement and is self-accommodating to bottle necks of various sizes, is displaced during the operation of putting the cap in place until it occupies substantially the position shown in Fig. 11 and affords a very tight hermetic seal. In addition to the gripping action of the tongues or fingers 39, the portion 43 of the gasket 35 affords substantially a lock by extending below the bottle neck projection 42 and being held in close contact therewith by the spring fingers 39. Thus by the combined lock and frictional gasket holding effect on the bottle neck, with the grip secured by the spring fingers 39 thereon, a very secure hermetic seal is obtained and, while the closures may be removed by application of sufficient force, as, for example, if the bottle is held in one hand and the closure pulled off by the other, there is no danger of the closure being removed in ordinary handling or carrying of the bottle by its top.

It will be seen that all the closures of the present invention are usable to an indefinite extent, that is to say, they can be removed and replaced as often as desired, which is a feature of very great advantage where food or other container contents are used up part by part and it is inconvenient to empty the entire contents of the container at one time.

The forms shown are for illustration only, and modifications and changes may be resorted to, within the scope of my claims.

I claim:

1. The combination of a container and a closure therefor, said closure comprising a cylindrical wall having upper and lower interior abutments and a resilient, compressible, cylindrical gasket of elongated cross section between said abutments, the normal distance between top and bottom of gasket being substantially greater than the distance between said abutments and the gasket being caused to arch inward with respect to its upper and lower edges to provide surplus material, the diameter of said container being such as to force the gasket into intimate engagement throughout its height with the interior surface of the closure and cause it to be held under compression between the container and closure.

2. The combination of an exteriorly grooved container and a closure therefor, said closure comprising a cylindrical wall having upper and lower interior abutments, and a resilient, compressible, cylindrical gasket of elongated cross section between said abutments, the normal distance between top and bottom of gasket being substantially greater than the distance between said abutments and the gasket being caused to arch inward with respect to its upper and lower edges to provide surplus material, the diameter of such container being such as to force the gasket into said groove and into intimate engagement throughout its height with the interior surface of the closure and cause it to be held under compression between the container and closure.

In testimony whereof, I have signed my name hereto.

ARLINGTON MOORE.